June 17, 1924.

S. R. WARREN

CABLE COUPLING

Filed Jan. 20, 1922

1,498,004

Inventor
Stephen R. Warren
By Robert H. Young
Attorney

Patented June 17, 1924.

1,498,004

UNITED STATES PATENT OFFICE.

STEPHEN R. WARREN, OF CHICAGO, ILLINOIS.

CABLE COUPLING.

Application filed January 20, 1922. Serial No. 530,619.

*To all whom it may concern:*

Be it known that I, STEPHEN R. WARREN, a citizen of the United States, residing at Chicago, in the county of Cook and State of Illinois, have invented certain new and useful Improvements in a Cable Coupling, of which the following is a specification.

This invention relates to improvements in cable couplings.

The object of the invention is to provide a coupling or toggle which will afford a safe and efficient connection and prevent chafing and cutting of the cables.

The invention is hereinafter more fully described in connection with the accompanying drawings. Objects of a more specific nature will become apparent in the description and the essential characteristics are summarized in the claims.

Figure 1:
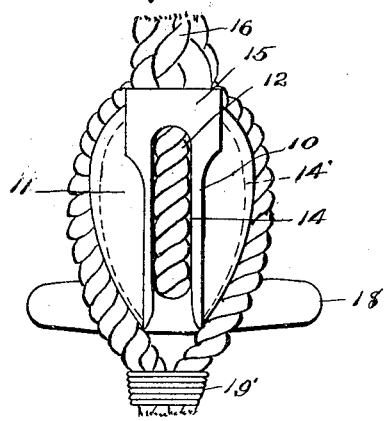
Fig. 1 is a side elevation of a single coupling.
Figure 2:
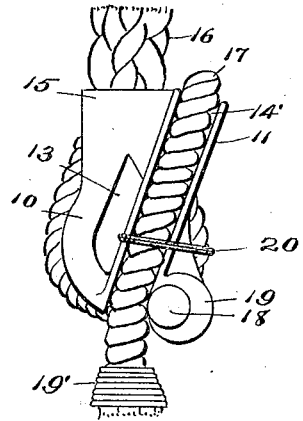
Fig. 2 is an end view of the same.

In Figures 1 and 2 the coupling consists of two thimbles 10 and 11 cast and machined into a compact unit. The thimble 10 is adapted to be disposed in axial alignment with cable 12 when a stress is placed upon the coupling. The thimble 10 is formed into an elongated eye having an opening 13 at the center and a grooved periphery 14 about which the cable 12 is looped. The body of the thimble is provided at the top with a socket portion 15 through which the cable enters to and finds exit from, the groove 14. The terminal of cable 12 extends above the socket 15 and is suitably spliced to the main strands of the cable, as indicated at 16.

The thimble 11 is arranged angularly with respect to the thimble 10, and is formed with a grooved periphery 14'. A cable 17 is looped about the grooved periphery 14'. Rounded pins 18 project from opposite sides of a boss 19 which is integral with the thimble unit. These pins are located near the base of the thimble 11 and so arranged that the flange on one side of groove 14' is substantially tangent to the rounded surfaces thereof. The sides of the loop formed by cable 17 are adapted to bear against the pins 18 and the terminal of the cable is spliced to the main strands at a point below the pin, as indicated at 19'. When in assembled relation the cables extending about the thimbles may be secured against displacement by lashing 20 extending around one branch of each eye, however, this is unnecessary when the cables are properly arranged in the grooves.

Figure 4:
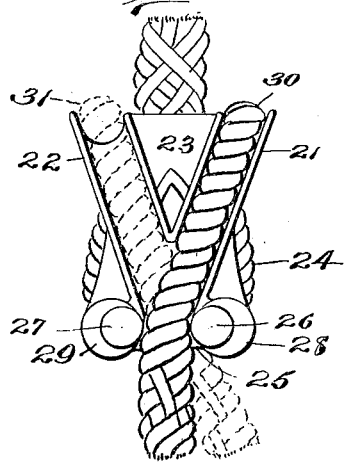
Fig. 4 is an end view thereof.
Figure 3:
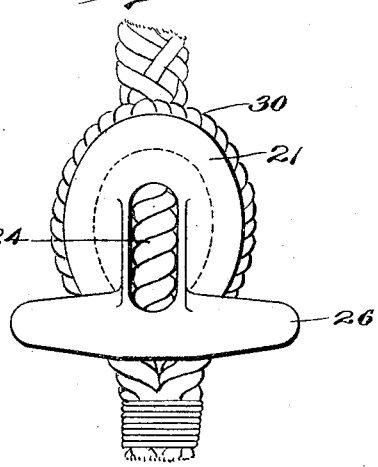
Fig. 3 is a side elevation of a double coupling.

In Figures 3 and 4 a similar coupling is illustrated in which two angularly disposed auxiliary thimbles 21 and 22 are cast integrally with a main thimble 23. The latter corresponds in construction to the thimble 10, above described, and a cable 24 is looped about its grooved periphery. The elongated eyes of thimbles 21 and 22 are arranged in symmetrical relation to the main thimble and converge near the base of the casting so that their grooved peripheries merge into a single passage 25 extending between spaced pins 26, 27. The latter extend from bosses 28, 29 cast integral with the thimbles. Either of the cables 30 or 31 may be looped about thimbles 21, 22 the terminals of the loops being spliced to the main strands of the respective cable at points slightly below the pins 26, 27.

I claim:

1. A cable coupling comprising a unitary structure including a thimble having a socket through which a cable is adapted to be inserted in forming a loop about said thimble, a second thimble in angular relation to the first, and pins projecting in opposite directions for guiding a cable looped about said angularly disposed thimble.

2. A cable coupling comprising a unitary structure including a main thimble, auxiliary thimbles arranged in angular relation to said main thimble, and spaced pins for guiding the cables engaging said auxiliary thimbles.

3. A cable coupling comprising a unitary structure including a thimble having a socket through which a cable is adapted to be inserted in forming a loop about said thimble, a second thimble in angular relation to the first, and means for guiding the cable looped about said angularly disposed thimble.

In testimony whereof I affix my signature.

STEPHEN R. WARREN.